United States Patent [19]
Bichel et al.

[11] 3,780,851
[45] Dec. 25, 1973

[54] CROP FEEDING CONVEYOR FOR A HARVESTER

[75] Inventors: Darwin Carl Bichel; Robert La Verne Malcolm, both of East Moline, Ill.

[73] Assignee: Deere & Company, Moline, Ill.

[22] Filed: June 29, 1972

[21] Appl. No.: 267,506

[52] U.S. Cl.................... 198/175, 198/195, 56/14.6
[51] Int. Cl........................................... B65g 19/00
[58] Field of Search................... 198/172, 190, 164, 198/175, 195, 173, 174; 56/14.6

[56] References Cited
UNITED STATES PATENTS

| | | | |
|---|---|---|---|
| 3,296,782 | 1/1967 | Mark et al. | 56/14.6 |
| 2,571,955 | 10/1951 | Shields | 198/175 |
| 956,520 | 5/1910 | Frase | 198/195 |
| 3,318,441 | 5/1967 | Keen et al. | 198/175 |
| 404,460 | 6/1889 | Akerson | 198/175 |

*Primary Examiner*—Evon C. Blunk
*Assistant Examiner*—Joseph E. Valenza
*Attorney*—H. Vincent Harsha et al.

[57] ABSTRACT

A self-propelled combine has a main separator body with a forward crop inlet and a feeder housing extending forwardly from the crop inlet. A transversely elongated harvesting header is mounted on the forward end of the feeder housing and delivers the crop through a crop transfer opening in its rear wall to a chain-and-slat type conveyor mounted within the feeder housing and operative to move the crop upwardly and rearwardly along the floor of the feeder housing to the body inlet. The conveyor includes three transversely spaced chains trained around coaxial rear drive sprockets and a forward feeder drum. The chains are interconnected by transverse slats, which are arranged in staggered rows. Each chain has a T-shaped cross section with a stem portion parallel to the floor of the feeder housing in the lower run of the conveyor, the opposite ends of the stem portions being attached to one of the outer chains and the center chain. The cross portion of each slat in the lower run of the conveyor is normal to the floor and in advance of the stem portion for engaging the crop and moving it along the floor.

3 Claims, 3 Drawing Figures

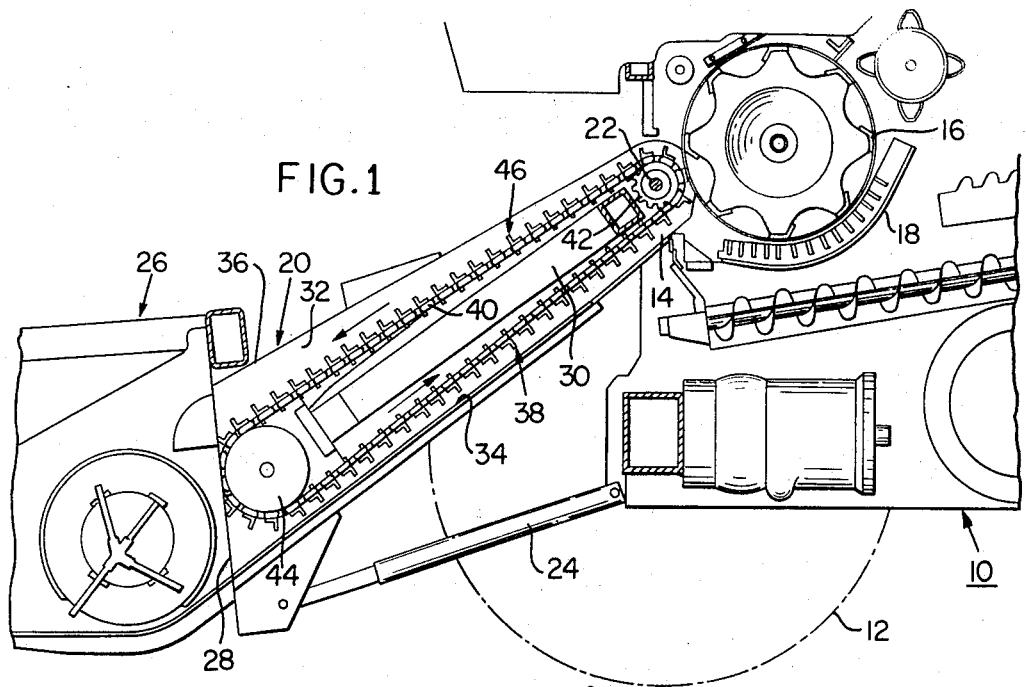
FIG.1
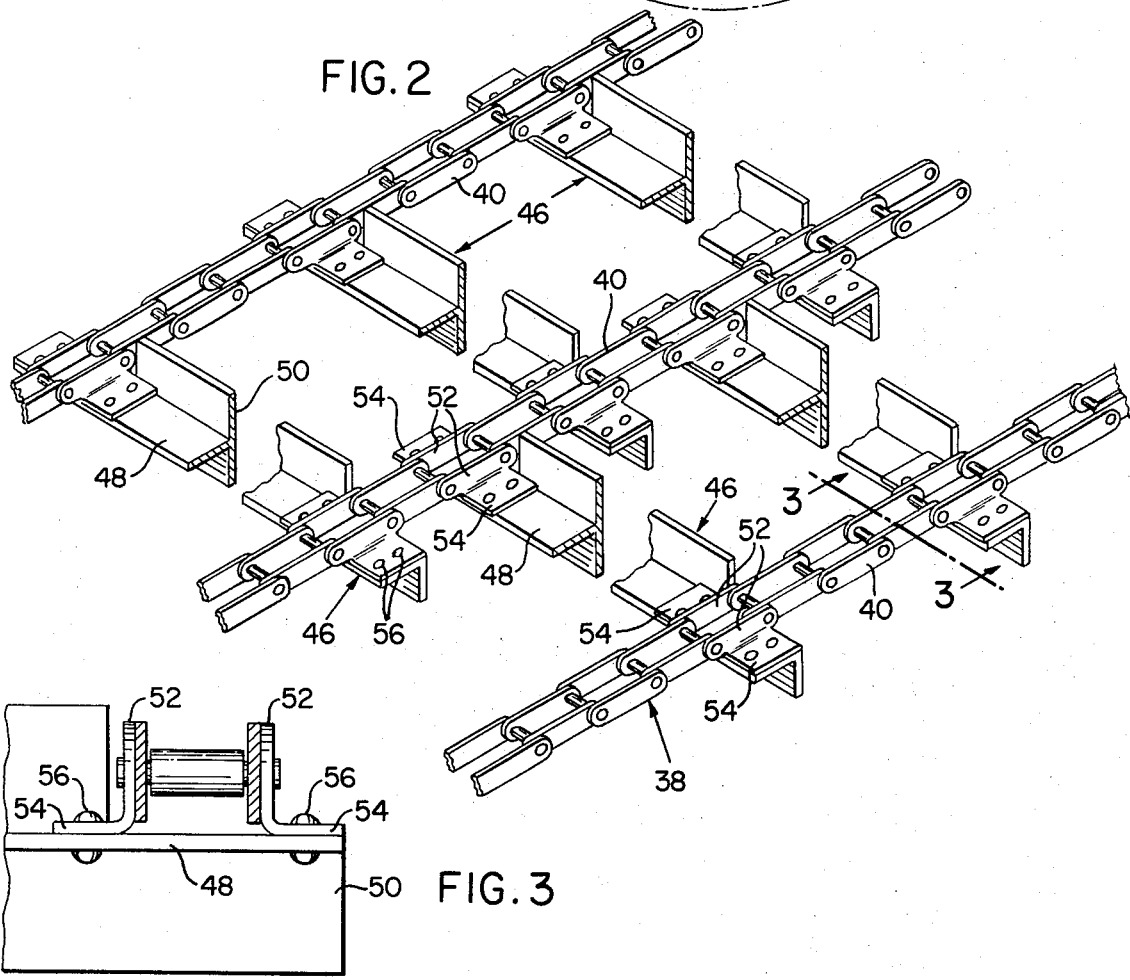
FIG.2
FIG.3

CROP FEEDING CONVEYOR FOR A HARVESTER

BACKGROUND OF THE INVENTION

This invention relates to a chain-and-slat type crop feeding conveyor for an agricultural harvesting machine, such as a combine or the like.

It is well known in the combine art to utilize such a conveyor to move crop material from the harvesting header upwardly and rearwardly along a floor of a feeder housing to the crop inlet on the main separator body of the combine. Such conveyors conventionally have included a plurality of chains trained around a transverse sprocket means at the rear of the feeder housing and a transverse drum at the forward end of the housing, the adjacent chains being connected by a plurality of transverse slats, which engage the crop and move it upwardly and rearwardly along the floor of the feeder housing to the crop inlet opening in the main separator body.

Preferably, the slats have a single edge contact with the crop material to give adequate contact pressure for feeding small grains or the like, which are relatively slick. The slats must also have adequate strength so that they will hold up when corn ears, which are relatively heavy, are being conveyed. Heretofore, conveyor slats of several different types of cross section have been utilized. For example, in addition to slats with rectangular cross sections, slats with inverted U-shaped cross sections, L-shaped cross sections, or Z-shaped cross sections have been utilized. In the case of the L- and Z-shaped cross sections, the base of the L or the Z has been disposed in a direction perpendicular to the floor of the feeder housing on the leading edge of the slat.

SUMMARY OF THE INVENTION

According to the present invention, there is provided an improved conveyor slat for a chain-and-slat type conveyor for feeding a crop in a combine or the like. More specifically, the improved conveyor slat is provided in the crop feeding conveyor in a combine feeder housing for moving the crop along the floor of the feeder housing, the conveyor slat having a T-shaped cross section with the stem portion of the slats disposed parallel to the feeder housing floor and the cross portion disposed on the leading edge of the slat normal to the floor.

An important feature of the invention resides in the fact that the slat provides a single edge contact with the material moving along the feeder housing floor for aggressive feeding of slick crop materials, such as in small grains with slick straw. Another important feature of the invention resides in the fact that the slat has a desirable section modulus to provide adequate strength for use in corn, so that the conveyor slat has characteristics which permit its use in any type of crop.

Still another feature of the invention resides in the mounting of the conveyor slats on the conveyor chains.

BRIEF DESCRIPTION OF THE DRAWINGS

FIG. 1 is a somewhat schematic side elevation in section of the forward end of a combine having the improved feeder housing conveyor.

FIG. 2 is a perspective view of a portion of the lower run of the conveyor with the central portions of the conveyor slats broken away.

FIG. 3 is an enlarged section view of one of the chains showing the mounting of one of the ends of the conveyor slat as viewed along the line 3—3 of FIG. 2.

DESCRIPTION OF THE PREFERRED EMBODIMENT

The invention is embodied in a self-propelled combine having a mobile main separator body, indicated in its entirety by the numeral 10, mounted on a pair of forward drive wheels 12 and steerable rear wheels (not shown). As is apparent, the left wheel 12 and the side of the body has been removed in FIG. 1 to illustrate some of the components mounted therein. The body has a forward crop inlet 14 and a transverse threshing cylinder 16, having an associated concave 18, is mounted immediately behind the crop inlet to separate the crop in the conventional manner.

A feeder housing, indicated generally by the numeral 20, extends downwardly and forwardly from the crop inlet 14, and, as is conventional, the feeder housing 20 is vertically swingable about a transverse pivot shaft 22 adjacent its rearward end, the adjustment being accomplished by a pair of lift cylinders 24 operative between the body 10 and the forward end of the feeder housing 20. A transversely elongated grain harvesting header or platform 26 is mounted on the front end of the feeder housing 20 in the conventional manner and has a central, rearward crop transfer opening 28, which communicates with the open front end of the feeder housing 20.

The construction of the feeder housing 20 is shown in greater detail in U.S. Pat. No. 3,537,243 to Bichel, issued 3 Nov. 1970, also assigned to the assignee herein. The feeder housing includes a generally rectangular, internal frame 30, to the opposite sides of which generally upright side walls 32 are attached, the left side wall 32 being removed in FIG. 1 to expose the interior of the feeder housing. The feeder housing also includes an upwardly and rearwardly inclined floor 34, which spans the width of the housing between the lower edges of the opposite side walls, and an upwardly and rearwardly inclined top 36, extending between the upper edges of the side walls. The feeder housing is open toward the front as previously described and communicates with the platform crop transfer opening 28, while the rearward end of the feeder housing is also open and registers with the crop inlet 14 in the main separator body. A chain-and-slat type crop feeding conveyor 38 is mounted within the feeder housing 20 for moving the crop from the platform opening 28 upwardly and rearwardly through the feeder housing to the crop inlet 14. The conveyor 38 includes three transversely spaced parallel chains 40, which are respectively trained around rear drive sprockets 42 and an axially transverse drum 44 adjacent the forward end of the feeder housing. The sprockets 42 are coaxially mounted on the shaft 22, about which the feeder housing 20 pivots, the shaft 22 being driven by a conventional drive (not shown) from the combine power source.

A plurality of identical slats 46 have their opposite ends connected to adjacent chains 40 and are spaced at regular intervals along the lengths of the chains. The two outer chains are equally spaced from the center chain a distance substantially equal to the length of the slats, and, as is apparent from FIG. 2, one end of each slat is connected to the center chain, while the outer ends of alternating slats are attached to one of the outer chains and the outer ends of the remainder of the slats are attached to the other outer chain, so that the slats are arranged in two staggered adjacent fore-and-aft rows with the inner end of one row slightly overlapping the inner end of the other row.

Each slat has a T-shaped cross section with a stem portion 48 parallel to the chains and a cross portion 50 perpendicular to the chains. The opposite ends of each slat are attached to the respective chains by means of a pair of attachment links 52 which are disposed at regular intervals in the respective chains. As is apparent, each attachment link 52 has an outwardly extending flange 54 parallel to the stem portion of the slat, the slats being attached to the attachment link flanges 54 by means of rivets 56.

As indicated by the arrows in FIG. 1, the lower run of the conveyor moves upwardly and rearwardly, while the upper run moves downwardly and forwardly, and the slats are attached to the underside of the respective chains in the lower run of the conveyor. To accommodate the chains, the opposite ends of the upper half of each slat cross portion 50 in the lower run of the conveyor are offset inwardly.

As is apparent, the conveyor 38 surrounds the feeder housing frame 30, and the conveyor 38 spans the width of the feeder housing 20, the central section of each slat being removed in FIG. 2 to reduce the size of the drawing.

In operation, the crop is removed from the field and converged and projected rearwardly through the crop transfer opening 28 by the harvesting components on the platform 26. The drum 44 floats vertically, although stop means are conventionally provided to maintain a small clearance between the slats and the feeder house floor 34 below the drum. As the crop moves through the crop transfer opening 28, it is pulled under the drum by the slats 46 and moved upwardly and rearwardly along the feeder housing floor 34 and discharged rearwardly through the crop inlet 14 as the conveyor chains move around the rear sprockets 42. The bottom edges of the slat cross portions 50 move along the floor 34 in the lower run of the conveyor, and the single edge contact with the crop material between the bottom edges and the floor provides aggressive feeding when straw or the like is being conveyed. When corn ears are being conveyed, the ears slide along the floor in advance of the slats, and the stem portions 48 of the slats provide adequate strength for moving the corn ears. Thus, the T-section slats have characteristics that permit their use in both small grains and corn.

We claim:

1. In a harvesting machine having a main body with a crop treating mechanism and a forward crop inlet, a forward harvesting header having a rearward crop transfer opening, and a crop feeder housing connecting the crop transfer opening with the crop inlet and having an upwardly and rearwardly inclined floor, the combination therewith of an improved conveyor mounted in the crop feeder housing for moving crops upwardly and rearwardly along the floor to the crop inlet and comprising: a pair of axially transverse, parallel wheel means respectively mounted in the feeder housing adjacent the front and rear ends; at least two conveyor chains trained around the wheel means and driven by one of said wheel means so that the lower run of the conveyor moves upwardly and rearwardly; and a plurality of transversely elongated conveyor slats extending between the adjacent conveyor chains at spaced intervals, each slat having a T-shaped cross section between the chains, the stem portion of each slat being disposed generally parallel to the floor and the cross portion of each slat being in advance of the stem portion and normal to the floor in the lower run of the conveyor so that only the lower edge of the cross portion of each slat moves along the floor, at least a portion of the crop being clamped between said lower edge and the floor and moved upwardly and rearwardly along the floor, each of said conveyor chains including attachment link means having a laterally extending flange parallel to said stem portion and means for connecting the stem portion of each slat to the conveyor chains, the opposite ends of the of each slat cross portion being offset inwardly to accommodate the conveyor chains.

2. The invention defined in claim 1 wherein three conveyor chains are provided and the slats are arranged in two rows, the slats in one row being connected to the center chain and one outer chain and the slats in the other row being connected to the center chain and the other outer chain, the slats in the adjacent rows being arranged in a staggered relationship.

3. The invention defined in claim 2 wherein the rear wheel means comprising three coaxially connected drive sprockets respectively drivingly engaging the three conveyor chains.

* * * * *